United States Patent [19]

Carbonaro et al.

[11] 4,446,289

[45] May 1, 1984

[54] POLYMERIZING AND COPOLYMERIZING OLEFINICALLY UNSATURATED COMPOUNDS AND MEANS THEREFOR

[75] Inventors: Antonio Carbonaro, Milan; Cesare Ferrero, Monza; Margherita Corbellini, Milan, all of Italy

[73] Assignee: Agip Petroli S.p.A., Rome, Italy

[21] Appl. No.: 398,649

[22] Filed: Jul. 15, 1982

[30] Foreign Application Priority Data

Jul. 29, 1981 [IT] Italy ............................... 23212 A/81

[51] Int. Cl.$^3$ .......................... C08F 4/02; C08F 10/00
[52] U.S. Cl. .................................. 526/142; 526/114; 526/122; 526/119; 526/125; 526/339; 526/348.6; 526/352; 502/154
[58] Field of Search ............... 526/114, 125, 119, 122, 526/142

[56] References Cited

U.S. PATENT DOCUMENTS 3,859,231  1/1975  Kochhar et al. .................... 526/125
4,194,992  3/1980  Corbellini et al. .................. 526/125
4,342,855  8/1982  Akimoto et al. .................... 526/125

*Primary Examiner*—Edward J. Smith
*Attorney, Agent, or Firm*—Morgan, Finnegan, Pine, Foley & Lee

[57] ABSTRACT

A novel process is disclosed for polymerizing and copolymerizing alpha olefins (ethylene included) also in the presence of conjugated diolephins, and more particularly for copolymerizing ethylene with 1,3-butadiene, based on the use of a plural-component catalyst system, one of said components being a novel complex which contains titanium and magnesium. The process gives, in yields higher than 200,000 grams of polymer per g of elemental Ti, ethylene-butadiene copolymers having a distribution of monomeric units characterized by a particular novel $^{13}$C-NMR spectrum, a high apparent specific gravity and such a grit size as to impart flowability to the dry product, and a distribution in the presence of sulphur and accelerators such as to acquire a gel content (fraction insoluble in boiling xylenes) over 50%.

23 Claims, 1 Drawing Figure

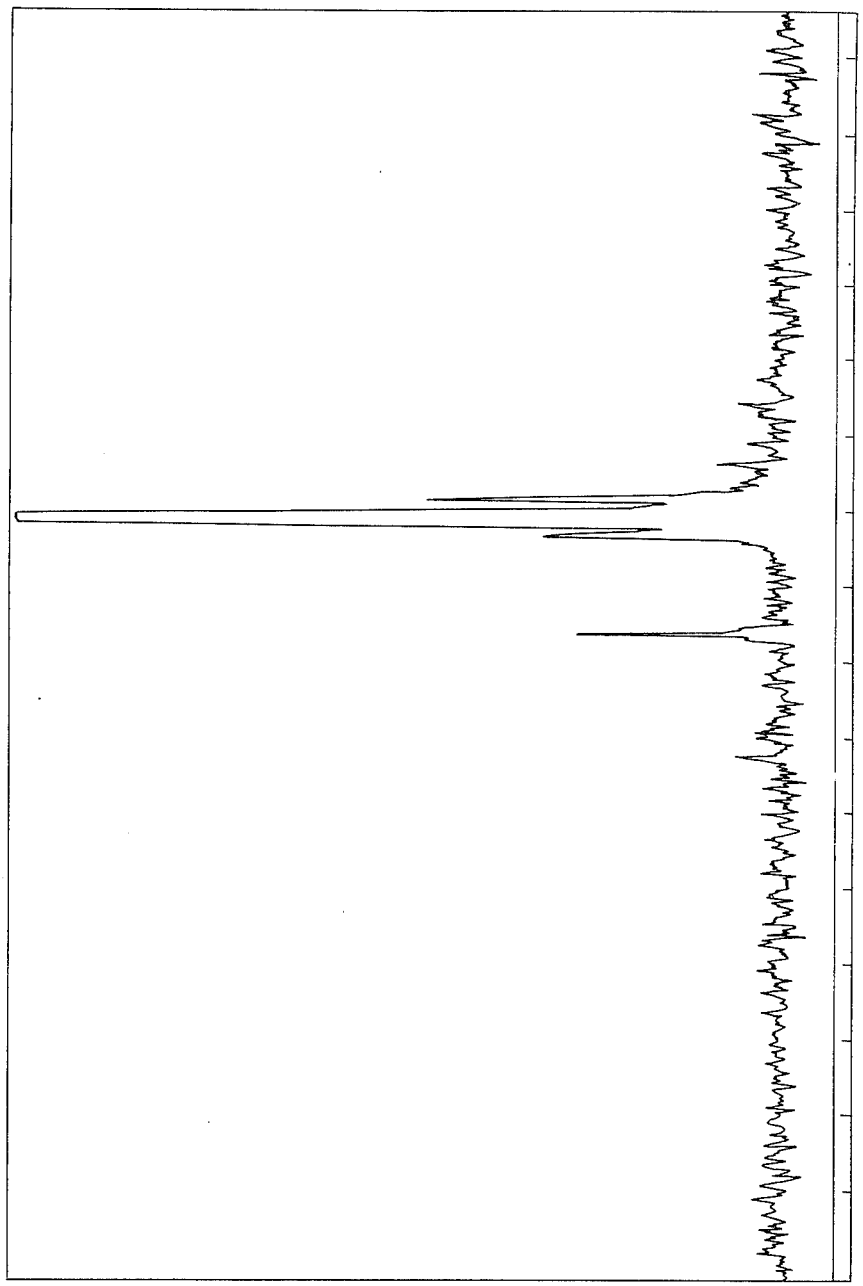

POLYMERIZING AND COPOLYMERIZING OLEFINICALLY UNSATURATED COMPOUNDS AND MEANS THEREFOR

This invention relates to a process for polymerizing and copolymerizing alpha-olefins, ethylene included, and in particular for the copolymerizaton of ethylene with 1,3-butadiene to obtain quite particular products, characterized by the use of a novel catalytic system which is based on a novel titanium-containing composition. The catalyst resulting from the association of said composition with two other components, as will be better detailed hereinafter, has so peculiar and surprising behaviour that, inter alia, it results in the preparation of ethylene-butadiene copolymers having a novel distribution of monomeric units, along with other properties to be detailed to a greater extent hereinafter.

The polymerization of ethylene in the presence of a titanium-based catalyst has been widely described in the patent literature. The processes described in such literature are mainly based on the advantages afforded by the use of catalytic systems having a high specific activity, by means of which there are obtained important simplifications of the polymerizations. Such catalytic systems, as a rule, are characterized by such a behaviour. Catalysts of the kind cannot copolymerize ethylene with butadiene with high yields.

Applicants are aware of previous patents and patent applications describing processes for preparing, in high yields relative to the catalyst employed, poly-alpha-olefins and copolymers of ethylene with a polyunsaturated hydrocarbon, such as 1,3-butadiene (See U.S. Pat. No. 4,194,992, and patent application Ser. No. 815,435 and Ser. No. 123,919).

In the above patents and patent applications there are employed both titanium-based catalytic systems and vanadium-based systems; however, purification of the final polymer from metallic residues is necessary. It is known, for example, that vanadium has an oxidative effect of a catalytic nature, which, as it takes place within the copolymer mass, greatly impairs the resistance of the copolymer to aging. In addition, several copolymers obtained according to the prior art have microstructural distributions (which can be detected by a $^{13}$C-NMR spectrum) which are far from being optimum in respect of their use in subsequent reactions, such as their cross-linking by the action of sulphur. Thus, an ethylene-butadiene copolymer containing 3.3% of units derived from the latter monomer, when subjected to curing with sulphur and accelerators, has only a 40% portion insoluble in boiling xylenes (patent application in USA, Ser. No. 123,919)

Applicants have now surprisingly found that it is possible to obtain, with very high yields relative to the transition metal employed, crystalline ethylene-butadiene copolymers having quite a particular distribution of monomeric units, a high apparent specific gravity and a narrow distribution of molecular weight, by a process which is capable of polymerizing and copolymerizing ethylene with alpha-olefins and which is characterized by the use of a 3-component catalytic system comprising a novel Ti-based composition.

The activity of the catalytic system is such as to produce an amount of polymer of at least 200,000 grams of polymer per gram of elemental titanium in the catalyst system and, by properly selecting the reaction conditions, even more than 1,000,000 grams of polymer per gram of elemental Ti in the catalyst system can be obtained.

Such large activities were unconceivable heretofore in the case of the ethylene-butadiene copolymerization, if one takes into consideration the well known depressing activity of butadiene upon the catalytic activity of catalytic systems towards mono-olefins (see for example, D. L. Christman, G. I. Keim, Macromolecules, 1, 358 (1968), M. Nowakowaska, H. Macejewska, J. Oblog, J. Pilichowski, Polymery, 11,320 (1966).

An additional and outstanding property of the process of the invention is that it gives polymerization products having a grit size distribution such as to impart to the powder product the necessary flowability for subsequent conversion and technological operations.

The catalytic system which best of all characterizes the invention is a system comprising (a) the product of the reaction between a titanium compound selected from among the Ti-halides and the Ti-alcoholates, magnesium vapours condensed at a low temperature, an organic halogenated compound or an inorganic halogenated compound and an alcohol, (b) an aluminium trialkyl having the formula $AlR_3$, (c) an aluminium halide having the formula $AlR_nX_{3-n}$ wherein X is Cl or Br and n is comprised between 0 and 2.

For the preparation of the component (a) instead of magnesium vapor, the vapor of another electrically positive and reducing metal, for example, manganese may be used.

The catalytic component (a) is novel.

It is usually obtained by reacting the mixture given above in two sequential steps.

During the first stage, vaporization or sublimation of magnesium (or other metal) is effected by heating the metal in vacuo and in the vicinity of, but not in contact with, the other reagents cooled to a low temperature.

In order that the reaction mixture may be maintained fluid it is possible to add to the cooled reagents an inert hydrocarbonaceous thinner. The temperature of the cooled reagents is selected so as not to exceed the partial pressure of the elemental magnesium or other metal subjected to heating and generally is between $-100°$ C. and $-10°$ C. The reagents for this initial stage are magnesium and the Ti-compound. The halogenated compound and the alcohol may optionally be present.

In this first stage the metallic magnesium vaporizes (or sublimes) and thus condenses and reacts with the cooled reagents.

The second reaction stage, which is started as soon as all the metallic magnesium has vaporized (or sublimed) consists in heating all the reagents given above to a temperature between 50° C. and 100° C. for a variable time (for example 1 hour) with stirring.

The suspension thus obtained is the novel catalytic component (a).

It is characterized by an ESR (Electron Spin Resonance) spectrum containing a broad signal ($\Delta H=$approximately 100 Gauss) at a g (electron spin "g" factor) equal to 1.89 ($\pm 0.01$) and by narrower signals ($\Delta H=$about 30 Gauss) at g=1.945 ($\pm 0.005$), at a g of 1.600 ($\pm 0.005$) and at a g of 1.977 ($\pm 0.005$), their relative intensity varying as the ratio ROH/Ti is varied: as this ratio is increased, the broader signal tends to fade out).

The novel catalytic composition is characterized, moreover, by X-ray spectra containing a reflection d corresponding to a Bragg distance of about 5.8 Å and- /or two further reflected d1 and d2 which angularly precede and follow the first reflections, because d1=2 d2 and the intensity of these increasing as the ratio ROH/Ti is increased and as the steric bulk of the group R is increased, and in the meanwhile the first reflection d tending to fade out.

By way of example, the values of d1 for R=CH$_3$, iso-C$_3$H$_7$, C$_6$H$_5$CH$_2$ are approximately 8.0, 8.5 and 14.5 Å, respectively.

Among the titanium compounds which can be used in the preparation of the catalytic component (a), those in which the metal is in its tetravalent state are preferred due to their solubility in the hydrocarbons. Examples are TiCl$_4$, Ti(OC$_4$H$_9$)$_4$ and Ti(OisoC$_3$H$_7$)$_4$.

Among organic halogenatd compounds alkyl chlorides are particularly suitable, whereas, among inorganic halogenated compounds, chlorides of heavy metals are preferred, the metal being one which can exist in at least two oxidation states and being at the time of their use, in a state above the minimum.

Particularly important is the use of the alcohol in the preparation of component (a). It can be a primary, a secondary, or a tertiary alcohol. The reactivity is influenced by the radical which carries the alcohol function: thus, for example, benzyl alcohol has proven to be less active than alcohols having an entirely aliphatic chain.

In order to optimize the behavior as polymerization catalysts, molar ratios are preferably selected within the following ranges:

between Mg and Ti-compound from 10:1 to 25:1 (gram-atoms:gram-mol);

between the halogenated compound and the Ti-compound from 10:1 to 60:1;

between the alcohol and the Ti-compound from 1:1 to 20:1.

The component (b) of the catalytic system is posed of a compound of aluminium of the kind AlR$_3$, R being an alkyl or an alkaryl radical. The simplest compounds, which, for this reason, are preferred, are triethylaluminium and triisobutylaluminium.

The component (c) of the catalytic system is, again, an aluminium compound, but it is halogenated. In practice, Al trichloride or Al tribromide and monoalkyl-halides or dialkyl halides, such as Al-diethylmonochloride or Al-isobutyldibromide are preferably used.

The molar ratios between the components (a), (b) and (c) of the catalytic system are not critical. For the purpose only of optimizing the activity, the ratios are selected within the ranges ratio of the component (b) to the Ti-compound (as contained in component (a)) from 50:1 to 1000:1;

ratio between the components (c) and (b) between from 0.1:1 and 10:1.

In order to adjust the molecular weights in the polymer, the Melt Flow Index of which (MFI$_{2.16}$) can be varied within the widest range. In this respect, hydrogen can be used in the conventional manner.

As regards the polymerization itself, there are no particular features which are distinctive over the procedures of the prior art. The polymerization temperature is usually comprised between 50° C. and 150° C. The reaction product can be recovered by a simple filtration step or by centrifugation of the reaction slurry and no purification is required before the drying stage.

The contents of the butadiene and ethylene units in the copolymer varies as a function of the relative amounts of the two monomers used.

While it is quite possible to obtain a copolymer having any desired composition, for a few applications the copolymers which contain but a few butadiene unsaturations are particularly important, the number of butadiene unsaturations being that which is sufficient to permit a conventional sulphur-base cure.

For example, by introducing from 1 to 5 mol % of butadiene units, many of the characteristics of high-density polybutadiene are maintained, in the main, whereas other important features (for example, resistance to high temperatures) are improved as the result of the formation of a lattice by a curing reaction.

The dry copolymer usually contains only negligible and harmless quantities of inorganic catalyst residues and usually possesses a particle (grit) size distribution which enables it to flow freely when poured. It has an apparent specific gravity of about 0.35 to 0.40 grams per milliliter.

The microstructure permits on ethylene-butadiene copolymer as produced according to the present invention to be distinguished from those obtained according to the prior art.

The single accompanying drawing shows the portion of the $^{13}$C-NMR spectrum relative to the saturated carbon atoms of a copolymer as prepared according to the process described hereinabove. There can be observed three peaks attributable to the methylene groups (—CH$_2$—) of the butadiene units, which, while being in the positions (namely 32.6, 32.7 and 32.9 ppm) of the tetramethyldisiloxane, already disclosed for similar copolymers (U.S. patent application Ser. No. 123,919) indicate a distribution of the monomeric units never observed hereinbefore.

The presence, in the raw copolymerization product of a sharp predominance of the methylene groups in alpha-position on a double bond, which differ from those which are found in 1,4-trans-polybutadiene and in the ethylene-butadiene block copolymers (with 1,4-trans sequence for butadiene) permit one to ascertain that the copolymer in question in which all, or nearly all of the butadiene units are still of the 1,4-trans type, is a copolymer different from those previously known.

The copolymers of the invention can be cured with sulphur and accelerators. The resulting products are usually more than 50% insoluble in boiling xylene. They exhibit a host of properties which make them particularly suitable for a number of uses, for example, a cross-linked polyethylene foams, as tubes for use at high temperatures, and as electrical insulators resistant to heat shocks.

The invention will now be illustrated by the following Examples, which describe by way of example, catalytic systems and polymers and copolymers according to this invention.

EXAMPLE 1

Preparation of the catalytic component (a)

The first stage of the preparation is carried out in a rotary flask at the centre of which there is arranged a spirally coiled tungsten filament connected to a source of electric power.

The flask, positioned horizontally, is immersed in a cold bath. The top of the apparatus is provided with nitrogen and vacuum inlets.

Around the tungsten spirals, 2.5 grams of magnesium wire (103 milligramatoms) are wound. The flask is charged under a nitrogen blanket with 300 mls of dehydrated n-heptane, 1.17 mls of tetrabutyl orthotitanate (3.45 millimol) and 31.5 mls of 1-chlorohexane (230 millimol). The flask is cooled to −70° C., vacuum is applied to $10^{-3}$ Torr, and the spiral is electrically heated so as to vaporize the metal Mg. A black precipitate is thus formed. On completion of vaporization, which takes about 20 minutes, nitrogen is fed into the apparatus and the still cold slurry is mixed with 5.1 mls of n-butanol (55 millimol). The flask is brought back to ambient temperature whereafter its contents is heated to boiling and allowed to boil for 2 hours.

Analysis of the resulting solid reaction product shows that it contains on a weight basis:
Ti = 1.7%
Mg = 19.90%
Cl = 39.2%
OR = 39.7%

EXAMPLE 2

A 5-liter autoclave equipped with an anchor stirrer is charged with 2 liters of anhydrous and de-aerated n-heptane, 10 millimols of Al (isobutyl)$_3$, 5 millimols of AlEtCl$_2$. The temperature is raised to 70° C. whereafter there are introduced hydrogen to a pressure of 2.9 bars, 230 g of 1,3-butadiene and ethylene to a gauge pressure of 9.7 bars. Then, a quantity of catalyst slurry, prepared according to Example 1, equal to 0.015 milligramatoms of metallic titanium, is added. Ethylene is continually fed so as to maintain a constant pressure for 2 hours.

There are obtained 245 grams of copolymer, equal to 330,000 grams per gram of metallic titanium.

The product has a
Melt Flow Index, at a load of 2.16 kg (MFI$_{2.16}$) ASTM D 1238/A) 0.40 g per 10 minutes
density (d) (ASTM D 1505) 0.9421 kg/dm$^3$
a content of trans-butadiene units of 2.96 mol% (IR method)
Maximum torque of the cured product (ASTM 2084 71T) of 36 pounds F.inch.

A compound of the following recipe, in parts by weight per 100 parts by weight of rubber, is prepared:

| Copolymer | 100 |
|---|---|
| ZnO | 5 |
| Stearic acid | 1 |
| 2.2-methylene-bis-4-methyl-tert.butylphenol (0.02246) | 1 |
| N—oxydiethylbenzothiazole-2-sulphonamide (NOBS special) | 1.5 |
| Dibenzthiazyl disulphide (Vulkarit D.M.) | 0.5 |
| Sulphur | 3 |

The compound is mixed at 150° C. on an open roll mill.

EXAMPLE 3

Preparation of the catalytic component (a)

The apparatus and the procedure are the same as described for EXAMPLE 1.

Around the tungsten spiral there are wound 2.45 g of magnesium wire (100 milligramatoms). The flask is charged with 300 mls of dehydrated n-heptane, 0.312 mls of titanium tetrachloride (2.85 millimol) and 30 mls of 1-chlorohexane (220 millimol). The cold slurry is mixd with 4.95 mls of isoamyl alcohol. The flask is brought back to the environmental temperature, whereafter it is heated to boiling and its contents allowed to boil for 2 hours. Analysis of the resulting solid reaction product shows that it contains by weight:
Ti = 1.33%
Mg = 20%
Cl = 45.5%
OR = 33.2%

EXAMPLE 4

A 5-liter autoclave equipped with an anchor-shaped stirrer is charged with 2 liters of anhydrous and de-aerated n-heptane, 10 millimols of Al (isobutyl)$_3$, 5 millimols of AlEtCl$_2$ and the temperature is raised to 70° C., whereafter there are added hydrogen to a pressure of 2.9 bar, 230 grams of 1,3-butadiene and ethylene to a gauge pressure of 9.7 bars. Then a quantity of slurry prepared according to EXAMPLE 3, equivalent to 0.0250 milligramatoms of metallic titanium, are also added. The ethylene feed is continued so as to maintain its pressure constant for 2 hours.

There are obtained 520 grams of copolymer, equivalent to 430,000 grams per gram of metallic titanium.

The characteristics of the product are as follows:
a Melt Flow Index, at a load of 2.16 kg (MFI$_{2.16}$, ASTM standard D 1238/A): 0.66 grams per 10 minutes;
Density (d) (ASTM standard D 1505): 0.9445 kg/dm$^3$; a content of trans-butadiene units of 4.05 mol %,
Poured density of the dry powder: (ASTM standard D 1895-69): 0.358 kg/dm$^3$, and a
Maximum torque on the cured product (ASTM standard 2084 71 T): 44 pounds F.inch.

A compound containing the copolymer is prepared as in EXAMPLE 2.

EXAMPLE 5

A 5-liter autoclave having an anchor-shaped stirrer is charged with 2 liters of anhydrous and de-aerated n-heptane, 8 millimols of Al (isobutyl)$_3$, 1 millimol of AlEtCl$_2$ and a quantity of catalyst, prepared according to EXAMPLE 3, equivalent to 0.005 milligramatoms of metallic titanium. The temperature is raised to 85° C., whereafter there are added hydrogen to a pressure of 2 bars and ethylene (containing 4% of butene-1) up to a gauge pressure of 5 bars.

Ethylene feed is continued so as to keep the pressure constant for 2 hours.

There are obtained 200 grams of copolymer, which represents a yield of 800,000 grams of polymer per gram of titanium. The copolymer has a butene contents of 0.88% by weight, a density of 0.9520 kg/m$^3$ and a MFI$_{2.16}$ kg equal to 0.7 grams per 10 mins.

EXAMPLE 6

Preparation of the catalytic component (a)

The apparatus and the procedure are similar to that specified in EXAMPLE 1.

Around the tungsten spirals there are wound 2.4 grams of magnesium wire (98 milligramatoms). The flask is charged with 315 mls of dehydrated n-heptane, 0.360 mls of titanium tetrachloride (3.3 millimols) and 26.9 mls of 1-chlorohexane (198 millimol), 2.7 mls of ethanol are added to the cold slurry. The flask is brought back to the environmental temperature, whereafter it is heated and its contents boiled for 2 hours.

Analysis of the resulting solid product shows that it contains by weight:
Ti: 1.7%

Mg: 22.55%
Cl: 46.75%
OR: 29%

EXAMPLE 7

A 5-liter autoclave equipped with an anchor-shaped stirrer is charged with 2 liters of anhydrous and de-aerated n- heptane, 8 millimols of Al (isobutyl)$_3$, 0.5 millimol of AlEtCl$_2$ and a quantity of catalyst, prepared according to EXAMPLE 6, equivalent to 0.005 milligramatoms of metallic titanium. The temperature is raised to 85° C., whereafter there are added hydrogen to a pressure of 2 bars and ethylene up to a gauge pressure of 5 bars.

Ethylene feed is continued so as to maintain the pressure constant during 2 hours.

There are obtained 225 grams of polyethylene, equivalent to 940,000 grams per gram of metallic titanium.

The product has a:

Melt Flow Index, at a load of 2.16 kg (MFI$_{2.16}$, ASTM Standard D 1238/A): 0.9 grams per 10 minutes
Density=0.965 gram/milliliter
Melting point (DSC)=136° C.

EXAMPLE 8

A 5-liter autoclave with an anchor-shaped stirrer is charged with 2 liters of anhydrous and de-aerated n-heptane, 10 millimols of Al (isobutyl)$_3$, 5 millimols of AlEtCl$_2$. The temperature is raised to 70° C. whereafter there are added hydrogen to a pressure of 2.9 bars, 230 grams of 1,3-butadiene and ethylene up to a gauge pressure of 97 bars. A quantity of catalyst, prepared according to EXAMPLE 6, equivalent to 0.0420 milligramatoms of metallic titanium, are added.

Ethylene feed is continued so as to maintain the pressure constant for 2 hours. There are obtained 420 grams of copolymer, equivalent to 4.8 parts per million of residual metallic titanium.

The product has a:

Melt Flow Index, at a load of 2.16 kg (MFI$_{2.16}$, ASTM Standard D 1238/A): 0.28 grams per 10 minutes
Density (d) (ASTM standard D 1505): 0.9424 kg/dm$^3$,
a content of trans-butadiene units=3.1% molar (IR Method)
Maximum torque on the cured product (ASTM 2084 71 T)=44 pound F.inch.

A compound containing the copolymer is prepared as in EXAMPLE 2. The curing conditions are the same as reported in EXAMPLE 2.

We claim:

1. A process for the polymerization of alpha olefins, ethylene included, and copolymerization of said alpha olefins with one or more conjugated diolefins, which comprises contacting the monomers concerned with a plural-component catalytic system comprised of:
   (a) the reaction product obtained by causing vapors of an electropositive and reducing metal to condense on a mixture of a titanium compound selected from among the halides and the alcoholates, and a halogenated organic or inorganic compound optionally in the presence of an inert thinner, and then heating the slurry thus obtained to a temperature between about 50° C. and about 100° C. in the presence of an alcohol;
   (b) an aluminum trialkyl corresponding to the formula AlR$_3$ wherein R is an alkyl or an alkaryl radical; and
   (c) an aluminum halide corresponding to the formula AlR$_n$X$_{3-n}$ wherein X is Cl or Br and n is between 0 and 2.

2. A process according to claim 1 wherein said electropositive and reducing metal in the component (a) of the catalytic system is magnesium.

3. A process according to claim 2 characterized in that the magnesium vapors in the component (a) of the catalytic system are obtained by heating the magnesium in a vacuum.

4. A process according to claim 2 characterized in that the component (a) of the catalytic system is prepared by sublimation of magnesium in a vacuum, under negative pressures variable between 1 Torr and 10$^{-5}$ Torr and at a temperature comprised between 300° C. and 650° C.

5. A process according to claim 1 characterized in that the component (a) of the catalytic system is prepared by carrying out the condensation of the vapours of the metal within an inert solvent selected from among the aliphatic or the aromatic hydrocarbons.

6. A process according to claim 1, characterized in that the vapours of the metal are condensed at a temperature comprised between −100° C. and −10° C.

7. A process according to claim 1 characterized in that the halogenated organic compound is selected from among the alkyl halides.

8. A process according to claim 1, characterized in that the inorganic halogenated compound is selected from among the chlorides of the heavy metals, the metal concerned being capable of existing in at least two oxidation states and which are at the time of use in a state above the minimum oxidation state.

9. A process according to claim 1, characterized in that the alcoholic compound is selected from among the aliphatic alcohols.

10. A process according to claim 1, characterized in that the molar ratio of the organic or inorganic halogenated compound to the vaporized metal is equal to or higher than 1.

11. A process according to claim 1, characterized in that the molar ratio of the organic or inorganic halogenated compound to the titanium compound is comprised between 10 and 60.

12. A process according to claim 1, characterized in that the molar ratio of the alcoholic compound to the titanium compound is equal to or higher than 1.

13. A process according to claim 1, characterized in that the molar ratio of the alcoholic compound to the titanium compound is comprised between 1 and 20.

14. A process according to claim 1, characterized in that the component (a) of the catalytic compound is obtained by reacting the vaporized metal and the titanium compound with ratios M/Ti, M being the metal concerned, expressed in gramatoms, equal to or higher than 1.

15. A process according to claim 1, characterized in that the component (a) of the catalytic system is obtained by reacting the vaporized metal and the titanium compound with M/Ti ratios, in gramatoms, comprised between 10 and 25.

16. A process according to claim 1, characterized in that the molar ratio between the component (b) of the catalytic system and the titanium compound contained in the component (a) of the catalytic system varies from 50 to 1000.

17. A process according to claim 1, characterized in that the molar ratio of the components (c) and (b) of the catalytic system is comprised between 0.1 and 10.

18. A process according to claim 1 characterized in that the polymerization or copolymerization reaction is carried out in the presence of an inert solvent.

19. A process according to claim 18 characterized in that the inert solvent is selected from among the aliphatic hydrocarbons.

20. A process according to claim 18 characterized in that the polymerization reaction is carried out at a temperature comprised between 50° C. and 150° C.

21. A process according to claim 18 characterized in that the polymerization or copolymerization reaction is carried out under a pressure variable from 1 to 50 atmospheres.

22. A process according to claim 18 characterized in that ethylene, or the alpha olefin and the conjugated diolefin are polymerized without any inert thinner being present.

23. A process according to claim 1 characterized in that the polymerization reaction is carried out using 1,3-butadiene as the conjugated diolefin.

* * * * *